US011711230B2

(12) United States Patent
Nandy et al.

(10) Patent No.: US 11,711,230 B2
(45) Date of Patent: Jul. 25, 2023

(54) MULTICAST PACKET MANAGEMENT FOR A VIRTUAL GATEWAY OF A DISTRIBUTED TUNNEL FABRIC

(71) Applicant: Hewlett Packard Enterprise Development LP, Houston, TX (US)

(72) Inventors: Tathagata Nandy, Bangalore (IN); Chethan Chavadibagilu Radhakrishnabhat, Bangalore (IN); Subramanian Muthukumar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/380,700

(22) Filed: Jul. 20, 2021

(65) Prior Publication Data

US 2023/0022760 A1 Jan. 26, 2023

(51) Int. Cl.

| | |
|---|---|
| ***H04L 12/18*** | (2006.01) |
| ***H04L 45/16*** | (2022.01) |
| ***H04L 12/46*** | (2006.01) |
| ***H04L 49/00*** | (2022.01) |
| ***H04L 45/64*** | (2022.01) |

(52) U.S. Cl.

CPC ........ *H04L 12/185* (2013.01); *H04L 12/4633* (2013.01); *H04L 45/16* (2013.01); *H04L 45/64* (2013.01); *H04L 49/70* (2013.01)

(58) Field of Classification Search

CPC ... H04L 12/185; H04L 12/4633; H04L 45/16; H04L 45/64; H04L 49/70

See application file for complete search history.

(56) References Cited

U.S. PATENT DOCUMENTS

2009/0073989 A1 * 3/2009 Cai ......................... H04L 45/50
370/395.53

FOREIGN PATENT DOCUMENTS

| | | | | |
|---|---|---|---|---|
| CN | 104106242 A | * 10/2014 | ............. | H04L 45/44 |
| EP | 3539235 B1 | * 8/2021 | ........... | H04L 1/1671 |
| WO | WO-2012079655 A1 | * 6/2012 | ......... | H04L 12/4625 |

* cited by examiner

*Primary Examiner* — Jianye Wu

(74) *Attorney, Agent, or Firm* — Park, Vaughan, Fleming & Dowler LLP

(57) ABSTRACT

A system for multicast packet management in a first switch in an overlay tunnel fabric is provided. The system can operate the first switch as part of a virtual switch in conjunction with a second switch of the fabric. The virtual switch can operate as a gateway for the fabric. During operation, the system can receive a join request for a multicast group. The system can then determine whether to forward the join request to the second switch based on a type of a first ingress connection of the join request. Upon receiving a data packet for the multicast group, the system can determine how to forward the data packet based on respective types of a second ingress connection and an egress connection of the data packet. The type of a respective connection can indicate whether the connection includes an overlay tunnel.

20 Claims, 11 Drawing Sheets

NETWORK 100
HOST
112
212
DISTRIBUTED TUNNEL FABRIC 110
DATA
REQUEST
VPN 130
103
101
102
ISL 140
VGS 106
LAG 200
107
214
EXTERNAL NETWORK 120
SOURCE
114

MULTICAST PACKET MANAGEMENT FOR A VIRTUAL GATEWAY OF A DISTRIBUTED TUNNEL FABRIC

BACKGROUND

Field

The present disclosure relates to communication networks. More specifically, the present disclosure relates to a method and system for facilitating efficient multicast packet management for a virtual gateway of a distributed tunnel fabric.

BRIEF DESCRIPTION OF THE FIGURES

In the figures, like reference numerals refer to the same figure elements.

DETAILED DESCRIPTION

Figure 1:
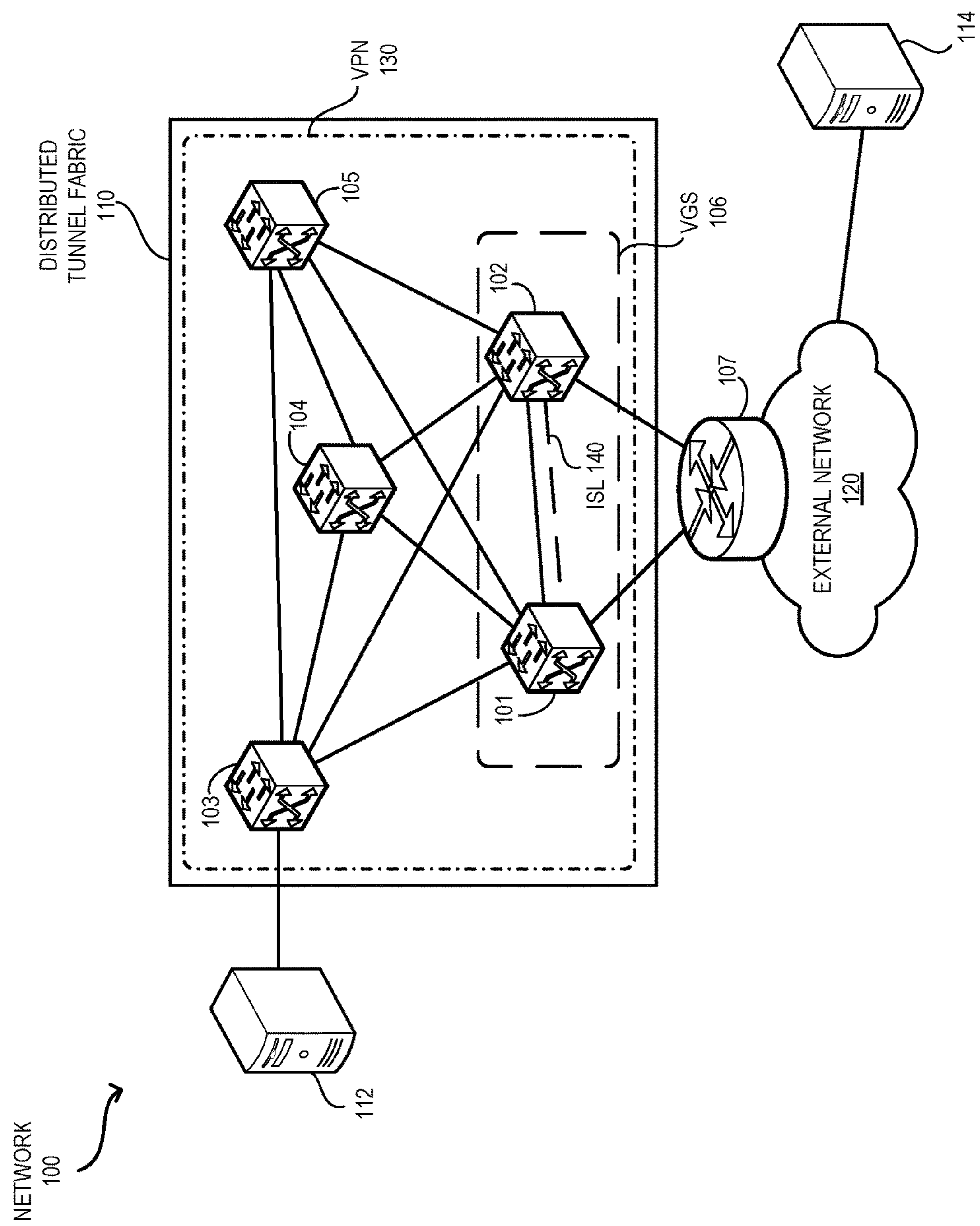
FIG. 1 illustrates an exemplary distributed tunnel fabric with a virtual gateway supporting efficient multi-destination packet management, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

Internet is the delivery medium for a variety of applications running on physical and virtual devices. Such applications have brought with them an increasing traffic demand. As a result, equipment vendors race to build switches with versatile capabilities. To do so, a switch may support different protocols and services. For example, the switch can support tunneling and virtual private networks (VPNs). The switch can then facilitate overlay routing for a VPN over the tunnels. For example, an Ethernet VPN (EVPN) can be deployed as an overlay over a set of virtual extensible local area networks (VXLANs). To deploy a VPN over the tunnels, a respective tunnel endpoint may map a respective client virtual local area network (VLAN) to a corresponding tunnel network identifier (TNI), which can identify a virtual network for a tunnel.

The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if the layer-3 routing and forwarding are needed. Since a VPN can be distributed across the tunnel fabric, a VPN over the tunnel fabric can also be referred to as a distributed tunnel fabric. A gateway of the fabric can be a virtual gateway switch (VGS) shared among a plurality of participating switches. Consequently, determining which of the participating switches should forward multicast traffic to and from the fabric can be challenging.

One aspect of the present technology can provide a system for multicast packet management in a first switch in an overlay tunnel fabric. The system can operate the first switch as part of a virtual switch in conjunction with a second switch of the fabric. The virtual switch can operate as a gateway for the fabric. During operation, the system can receive a join request for a multicast group. The system can then determine whether to forward the join request to the second switch based on a type of a first ingress connection of the join request. Upon receiving a data packet for the multicast group, the system can determine whether to forward the data packet to the second switch and an egress connection of the data packet based on a type of a second ingress connection of the data packet and a type of the egress connection. The type of a respective connection can indicate whether the connection includes an overlay tunnel.

In a variation on this aspect, the system can determine whether to forward the data packet by determining a forwarding role of the first switch for the virtual switch.

In a further variation, the forwarding role at least indicates that the first switch is a primary switch for the virtual switch or has received the data packet.

In a variation on this aspect, the type of the first ingress connection corresponds to a tunnel of the fabric. The system can then forward the join request to the second switch and a source of the multicast group.

In a variation on this aspect, the type of the first ingress connection corresponds to an inter-switch link coupling the second switch. The system can then forward the join request to a source of the multicast group based on the type of the egress connection of the data packet.

In a variation on this aspect, the type of the egress connection of the data packet corresponds to a tunnel of the fabric associated with a requesting host of the join request. The system can forward the data packet via the tunnel.

In a variation on this aspect, the type of the egress connection of the data packet corresponds to a logical layer-3 interface coupling an external switch. The system can then forward the data packet via the logical layer-3 interface and the second switch.

In a further variation, the logical layer-3 interface is deployed over a link aggregation coupling an external switch to the first and second switches. The system can then forward the data packet by determining whether the first switch is to forward the data packet for the link aggregation.

In a variation on this aspect, the type of the egress connection of the data packet corresponds to a routed port coupling an external switch. The system can then forward the data packet to the external switch via the routed port and to the second switch via a dedicated sub-interface to the second switch.

In a further variation, the system can refrain from forwarding the join request to the second switch.

The aspects described herein solve the problem of efficiently managing multicast packets at a participating switch of a VGS by (i) determining whether to synchronize a join request with other participating switches based on the type of ingress connection of the join request; and (ii) determining whether to synchronize a multicast data packet with other participating switches and forward the data based on the type of ingress and egress connections of the data packet. Here, the type of a respective connection can indicate whether the connection includes an overlay tunnel. This allows a participating switch to independently determine whether to forward multicast control and data packets to and from the fabric.

The fabric can include a VGS that can couple the fabric to other networks. Typically, at least two switches can operate as a single switch in conjunction with each other to facilitate the VGS. Switches participating in the VGS can be referred to as participating switches. A respective participating switch can consider the other participating switches as peer participating switches (or peer switches). The VGS can be associated with one or more virtual addresses (e.g., a virtual Internet Protocol (IP) address and/or a virtual media access control (MAC) address). A respective tunnel formed at the VGS can use the virtual address to form the tunnel endpoint. As a result, other tunnel endpoints of the fabric can consider the VGS as the other tunnel endpoint for a tunnel instead of any of the participating switches. To forward traffic toward the VGS, a tunnel endpoint of the fabric can perform a load balancing operation (e.g., based on hashing on a respective packet) and select one of the participating switches as the destination (i.e., as the other tunnel endpoint). The tunnel endpoint can then forward the packet via a tunnel between the tunnel endpoints.

On the other hand, an external switch, such as a layer-3 router supporting Protocol-Independent Multicast (PIM), can be coupled to the VGS via a switched virtual interface (SVI), which can be a logical layer-3 interface. Under such a scenario, the SVI can be configured for a link aggregation (LAG) coupling the external switch. The external switch can then forward traffic to one of the participating switches. The external switch can also be coupled to individual participating switches via a respective routed-only port (ROP). An ROP can facilitate layer-3 functionalities for the port without binding to a virtual local area network (VLAN). The external switch can then forward traffic to individual participating switches. Since the SVG is associated with multiple participating switches, each of the participating switches may receive a multicast control or data packet. Therefore, determining which participating switch should forward multicast traffic to and from the fabric can be challenging.

To solve this problem, a respective participating switch pair can maintain an inter-switch link (ISL) between them for sharing multicast control and/or data packets. An ISL can be a layer-2 or layer-3 connection that allows data forwarding between two switches. The ISL can also be based on a tunnel between the participating switch pair. A participating switch can synchronize a multicast initiation control message for a multicast group, such as a PIM Hello message, with a respective peer participating switch via the corresponding ISL. On the other hand, a participating switch can synchronize a multicast join request, such as a PIM Join message, with a respective peer participating switch if the join request is received from the fabric or an external switch coupled via an SVI. This allows a respective participating switch to be aware of the multicast memberships for the VGS. If one of the participating switches becomes unavailable, the other participating switches can then continue forwarding multicast packets without rejoining the multicast group.

When a participating switch receives a data packet for a multicast group, the participating switch determines whether to forward and synchronize the packet based on the ingress and egress connections of the packet. Furthermore, based on a forwarding policy, either the receiving switch or the primary switch of the VGS can forward the packet to the host. If the participating switch receives the data packet from the fabric, the source of the multicast group can be coupled to one of the tunnel endpoints of the fabric, and the requesting host can be reachable via an external switch. The participating switch can then forward the data packet to a respective peer participating switch via a peer connection. If the external switch is coupled to the VGS via an SVI, such as an SVI over a LAG, the peer connection can be an ISL. The SVI can be a logical layer-3 interface. On the other hand, if the external switch is coupled to the VGS via an ROP, the peer connection can be a dedicated sub-interface.

On the other hand, if the participating switch receives the data packet from an external switch, the source of the multicast group can be reachable via the external switch, and the host can be reachable via the fabric. The participating switch can then determine whether the ingress connection of the packet is an SVI or an ROP. If the ingress connection is based on an SVI, one of the participating switches can receive the data packet from the external switch based on a VLAG policy and forward the data packet with a respective peer participating switch via a peer connection. However, if the ingress connection is based on an ROP, a respective participating switch can receive the data packet from the external switch based on individual links. Consequently, the participating switches do not need to share the data packet.

To facilitate the data forwarding and synchronization operations, a respective participating switch of the VGS can be configured for specific scenarios. Based on the configurations, the VGS can facilitate efficient distribution of multicast traffic to and from the fabric without requiring modifications to standard multicast protocols, such as PIM and Internet Group Management Protocol (IGMP). If the tunnel coupling the VGS can facilitate a layer-2 extension and the host is external to the fabric (e.g., coupled to an external switch), a respective participating switch can be configured as a designated router (DR). Consequently, each of the participating switches can forward the multicast data to the downstream connection.

Furthermore, if the host is coupled to the fabric via an external layer-3 switch, such as a PIM switch, the participating switches can bypass the prime neighbor checking process. The prime neighbor in the VGS can be responsible for forwarding join requests upstream. Since the prime neighbor checking process is bypassed, each of the participating switches can forward the multicast join request to the upstream connection. Moreover, if the tunnel coupling the VGS can facilitate a layer-2 extension and the source is coupled to the fabric via a layer-3 SVI, a respective participating switch can be configured as a DR and can bypass the prime neighbor checking process.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an exemplary distributed tunnel fabric with a virtual gateway supporting efficient multi-destination packet management, in accordance with an aspect of the present application. A network 100 can include a number of switches and devices. In some examples, network 100 can be an Ethernet, InfiniBand, or other networks, and may use a corresponding communication protocol, such as Internet Protocol (IP), FibreChannel over Ethernet (FCoE), or other protocol. Network 100 can include a distributed tunnel fabric 110 comprising switches 101, 102, 103, 104, and 105. Switches 101 and 102 of fabric 110 can be coupled to a core switch 106. Fabric 110 can be coupled to an external network 120 via switch 106.

In FIG. 1, a respective link in fabric 110 can be a tunnel. Switches of fabric 110 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec). A VPN 130, such as an EVPN, can be deployed over fabric 110. Fabric 110 can include a VGS 106 that can couple fabric 110 to an external network 120. Here, switches 101 and 102 can operate as a single switch in conjunction with each other to facilitate VGS 106. VGS 106 can be associated with one or more virtual addresses (e.g., a virtual IP address and/or a virtual MAC address). A respective tunnel formed at VGS 106 can use the virtual address to form the tunnel endpoint.

As a result, other tunnel endpoints, such as switches 103, 104, and 105, of fabric 110 can consider VGS 106 as the other tunnel endpoint for a tunnel instead of switches 101 and 102. To forward traffic toward VGS 106, a switch in fabric 110, such as switch 105, can perform a load balancing operation and select one of switches 101 and 102 as the destination (i.e., the other tunnel endpoint). On the other hand, an external switch 107, which can be a layer-3 router supporting PIM, can be coupled to VGS 106. Suppose that device 114, which can be coupled to fabric 110 via switch 107, forwards traffic to device 112 coupled to switch 103 of fabric 110. Here, each of devices 112 and 114 can be any device capable of requesting and receiving data from a multicast group.

If switch 107 is coupled to VGS 106 via an SVI (e.g., using a multicast LAG), switch 107 can forward traffic from device 114 to one of switches 101 and 102. On the other hand, if switch 107 is coupled to switches 101 and 102 via respective ROPs, switch 107 can then forward traffic to switches 101 and 102. Since VGS 106 is associated with multiple switches 101 and 102, each of switches 101 and 102 may receive a multicast control or data packet. Therefore, determining which participating switch of VGS 106 should forward multicast traffic to and from fabric 110 can be challenging.

To solve this problem, switches 101 and 102 can maintain an ISL 140 between them for sharing multicast control and/or data packets. Switch 101 and 102 can synchronize a multicast initiation control message for a multicast group, such as a PIM Hello message, via ISL 140. Furthermore, switch 101 and 102 can synchronize a multicast join request, such as a PIM Join message, if the join request is received from fabric 110 or switch 107 via an SVI. This allows both switches 101 and 102 to be aware of the multicast memberships for VGS 106. If one of switches 101 and 102 becomes unavailable, the other switch can then continue forwarding multicast packets without rejoining the multicast group.

When a participating switch, such as switch 102, receives a data packet for a multicast group, switch 102 can determine whether to forward and synchronize the packet based on the ingress and egress connections of the packet. Furthermore, based on a forwarding policy, either switch 102 or the primary switch, which can be switch 101, of VGS 106 can forward the packet to the host. If switch 102 receives the data packet from fabric 110, the source of the multicast group can be device 112, and the requesting host can be device 114. Switch 102 can then forward the data packet to switch 101 via a peer connection. If switch 107 is coupled to VGS 106 via an SVI, the peer connection can be ISL 140. On the other hand, if switch 107 is coupled to switches 101 and 102 of VGS 106 via respective ROPs, the peer connection can be a dedicated sub-interface between switches 101 and 102.

On the other hand, if switch 102 receives the data packet from switch 107, the source of the multicast group can be device 114, and the requesting host can be device 112. Switch 102 can then determine whether the ingress connection of the packet, which can be between VGS 106 and switch 107, is an SVI or an ROP. If the ingress connection is based on an SVI, switch 102 can receive the data packet from switch 107 based on a VLAG policy and forward the data packet to switch 101 via a peer connection. However, if the ingress connection is based on an ROP, switches 101 and 102 can receive the data packet from switch 102 based on individual links. Consequently, switches 101 and 102 do not need to share the data packet. In this way, VGS 106 can facilitate the efficient distribution of multicast traffic to and from fabric 110 without requiring modifications to standard multicast protocols, such as PIM and IGMP.

To facilitate the data forwarding and synchronization operations, a respective participating switch of VGS 106 can be configured for specific scenarios. If the tunnels of fabric 110 facilitate a layer-2 extension and the requesting host is device 114 (e.g., coupled to an external switch, such as switch 107), both switches 101 and 102 can be configured as DRs. Consequently, each of switches 101 and 102 can forward the multicast data to the downstream connection via switch 107. Furthermore, if switch 107 is a layer-3 switch, such as a PIM switch, switch 101, and 102 can bypass the prime neighbor checking process. Since the prime neighbor checking process is bypassed, each of switches 101 and 102 can forward the multicast join request to the upstream connection via fabric 110. On the other hand, if the tunnels of fabric 110 facilitate a layer-2 extension and the source is device 114, which can be coupled to fabric 110 via a layer-3 SVI, switches 101 and 102 can be configured as DRs and can bypass the prime neighbor checking process.

Figure 2A:
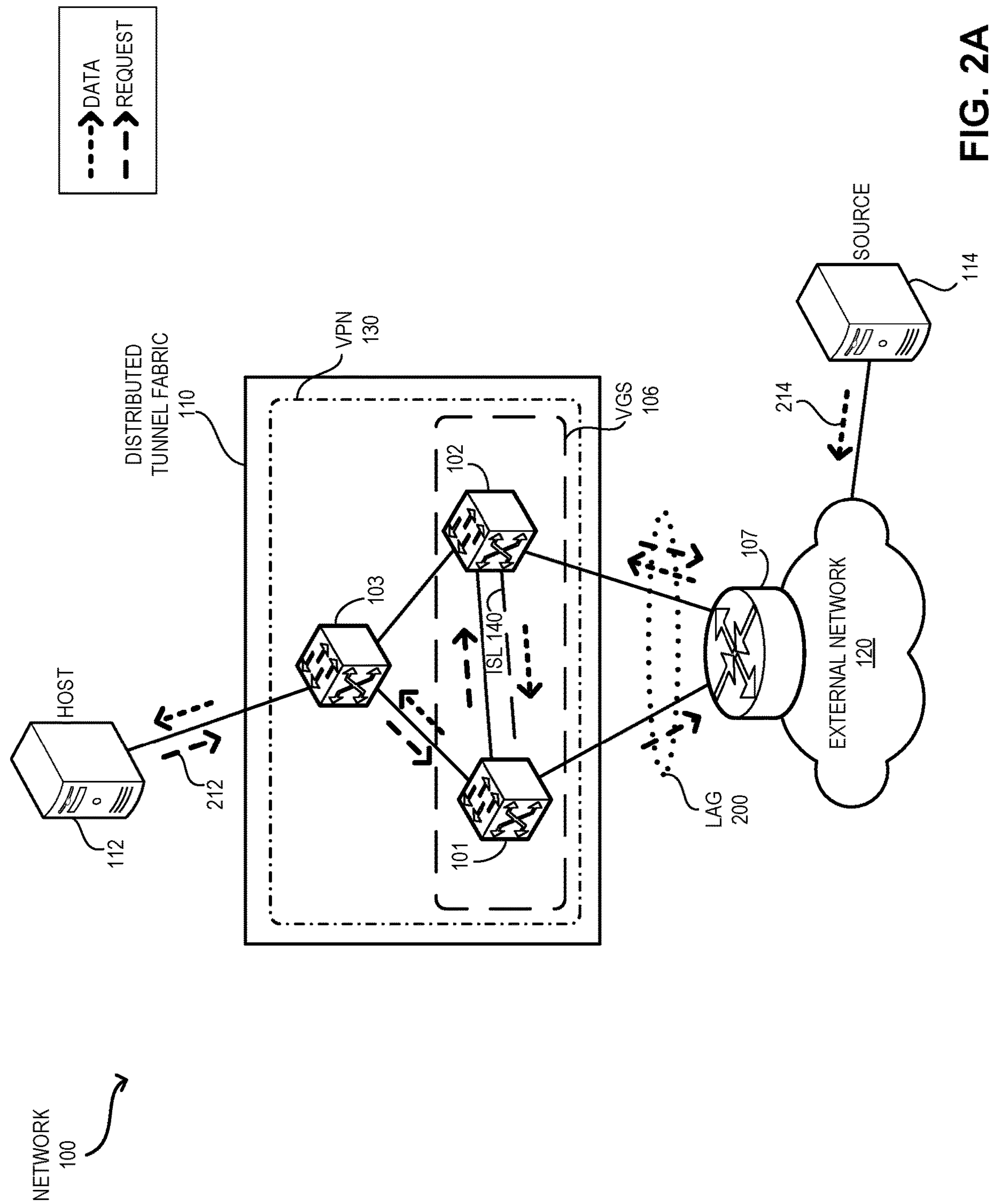
FIG. 2A illustrates exemplary multi-destination packet management for a source coupled to a distributed tunnel fabric via a switched virtual interface (SVI), in accordance with an aspect of the present application.

FIG. 2A illustrates exemplary multi-destination packet management for a source coupled to a distributed tunnel fabric via an SVI, in accordance with an aspect of the present application. In this example, device 114 can be the source of data for a multicast group. Device 114 can be coupled to switch 107, which can be coupled to fabric 110 via an SVI. Device 112 can be a requesting host for the multicast group. Furthermore, switch 107 can be coupled to VGS 106 via a LAG 200. Consequently, switch 107 can be coupled to switches 101 and 102, and the coupling links can be aggregated based on a link aggregation protocol, such as Link Aggregation Control Protocol (LACP). In some embodiments, LAG 200 can be a multicast LAG. To facilitate the efficient distribution of multicast traffic, switches 101 and 102 can synchronize multicast control packets, such as PIM join and hello messages, via ISL 140. This allows switches 101 and 102 to remain in a synchronized state for the multicast group.

During operation, device 112 can send a join request 212 for the multicast group to switch 103. Switch 103 can forward join request 212 to one of switches 101 and 102 based on a tunnel forwarding policy (e.g., hashing, load balancing, round-robin, etc.) via the corresponding tunnel. Suppose that switch 101 receives join request 212. Switch 101 can then synchronize join request 212 with switch 102 by forwarding join request 212 via ISL 140, which can be a layer-3 connection. Subsequently, switches 101 and 102 can forward join request 212 to switch 107. Switch 107 can then add LAG 200 to its outgoing interface list for the multicast group (e.g., by creating a corresponding "mroute" entry). Upon receiving a multicast data packet 214 from device 114, switch 107 can forward packet 214 to LAG 200. To do so, switch 107 can select one of the links of LAG 200 and forward packet 214 based on a LAG forwarding policy (e.g., load balancing, round-robin, etc.).

If switch 107 selects the link coupling switch 102, packet 214 can arrive at switch 102. Subsequently, switch 102 can synchronize packet 214 with switch 101 by forwarding packet 214 via ISL 140. In this way, both switches 101 and 102 would receive packet 214. The primary switch of VGS 106 can then forward packet 214 to switch 103 via a tunnel. If switch 101 is the primary switch, switch 101 can forward packet 214 to switch 103 via the corresponding tunnel. Forwarding via a tunnel includes encapsulating packet 214 with an encapsulation header and forwarding the encapsulated packet based on the encapsulation header. The source and destination addresses of the encapsulation header can correspond to VGS 106 (or switch 102) and switch 103, respectively. In some embodiments, Switches 101 and 102 can then determine whether local forwarding is enabled. If local forwarding is enabled, whichever switch receives packet 214 can forward the packet. Under such a scenario, switch 102 can forward packet 214 instead of switch 101. Switch 103 can then forward packet 214 to device 112.

Figure 2B:
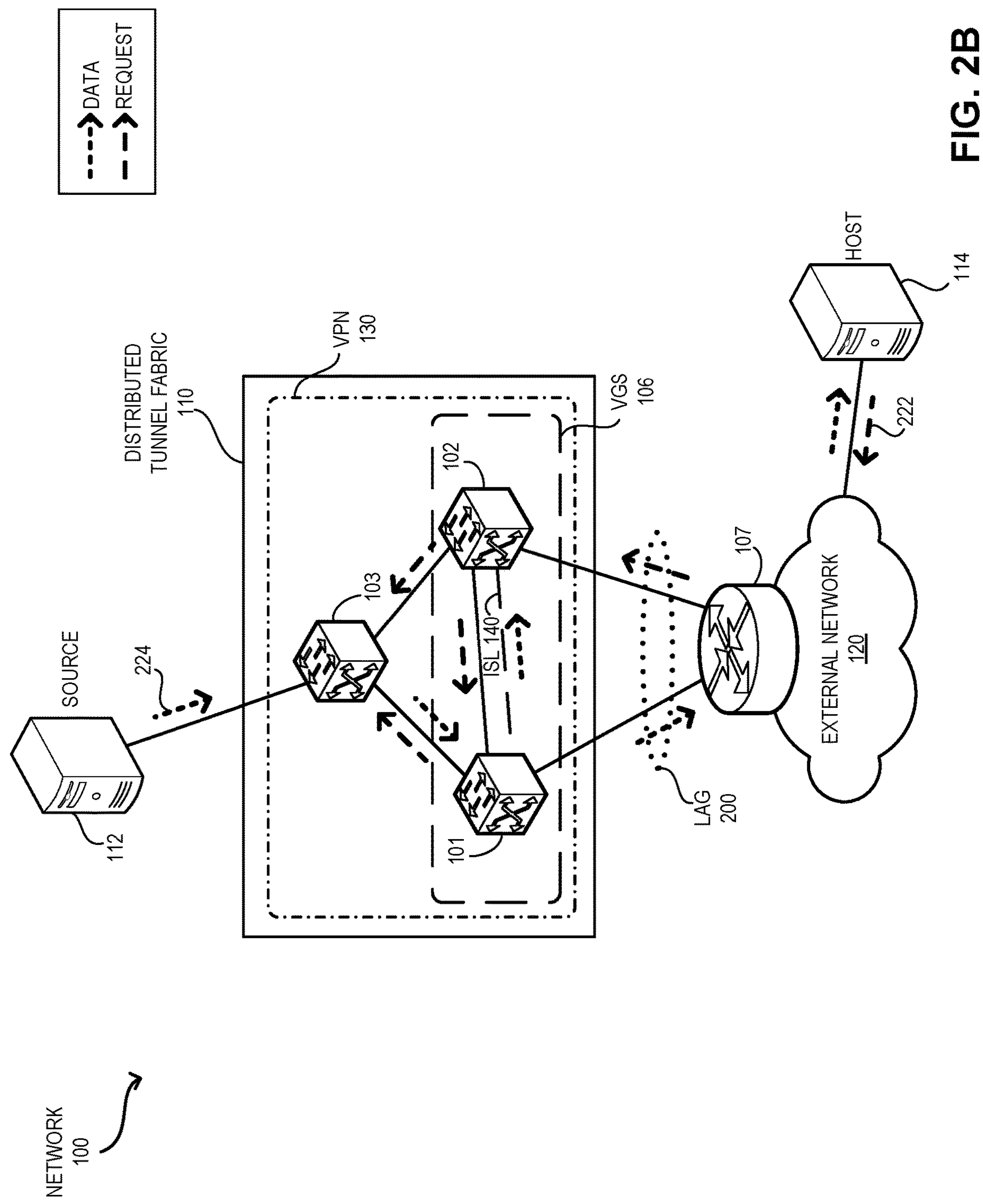
FIG. 2B illustrates exemplary multi-destination packet management for a host coupled to a distributed tunnel fabric via an SVI, in accordance with an aspect of the present application.

FIG. 2B illustrates exemplary multi-destination packet management for a host coupled to a distributed tunnel fabric via an SVI, in accordance with an aspect of the present application. In this example, device 112 can be the source of data for a multicast group. Device 114 can be a requesting host for the multicast group. Device 114 can be coupled to switch 107, which can be coupled to fabric 110 via an SVI. Switch 107 can be coupled to VGS 106 via LAG 200. To facilitate the efficient distribution of multicast traffic, switches 101 and 102 can synchronize multicast control packets, such as PIM join and hello messages, via ISL 140. This allows switches 101 and 102 to remain in a synchronized state for the multicast group.

During operation, device 114 can send a join request 222 for the multicast group to switch 107. Switch 107 can forward join request 222 to one of switches 101 and 102 based on a LAG forwarding policy. Suppose that switch 102 receives join request 222. Switch 102 can then synchronize join request 222 with switch 101 by forwarding join request 222 via ISL 140, which can be a layer-3 connection. Subsequently, switches 101 and 102 can forward join request 222 to switch 103. Switch 103 can then add the corresponding layer-3 TNI, which can identify the tenant associated with device 112, to its outgoing interface list for the multicast group. Upon receiving a multicast data packet 224 from device 112, switch 103 can select one of switches 101 and 102 based on a tunnel forwarding policy.

If switch 103 selects switch 101, switch 103 can forward packet 224 to switch 101 as a unicast packet via the corresponding tunnel. Switch 101 can then synchronize packet 224 with switch 102 by forwarding packet 224 via ISL 140. In this way, both switches 101 and 102 would receive packet 224. Since switch 101 has received the packet from switch 103, switch 101 can forward packet 224 via LAG 200 to switch 107. Switch 107 can then forward packet 224 to device 114. In some embodiments, switches 101 and 102 can be configured with an egress filtering rule that precludes a switch from forwarding packets received via an ISL to an external switch. Based on the filtering rule, switch 102 can refrain from forwarding packet 224 to switch 107, thereby avoiding packet duplication.

Figure 3A:
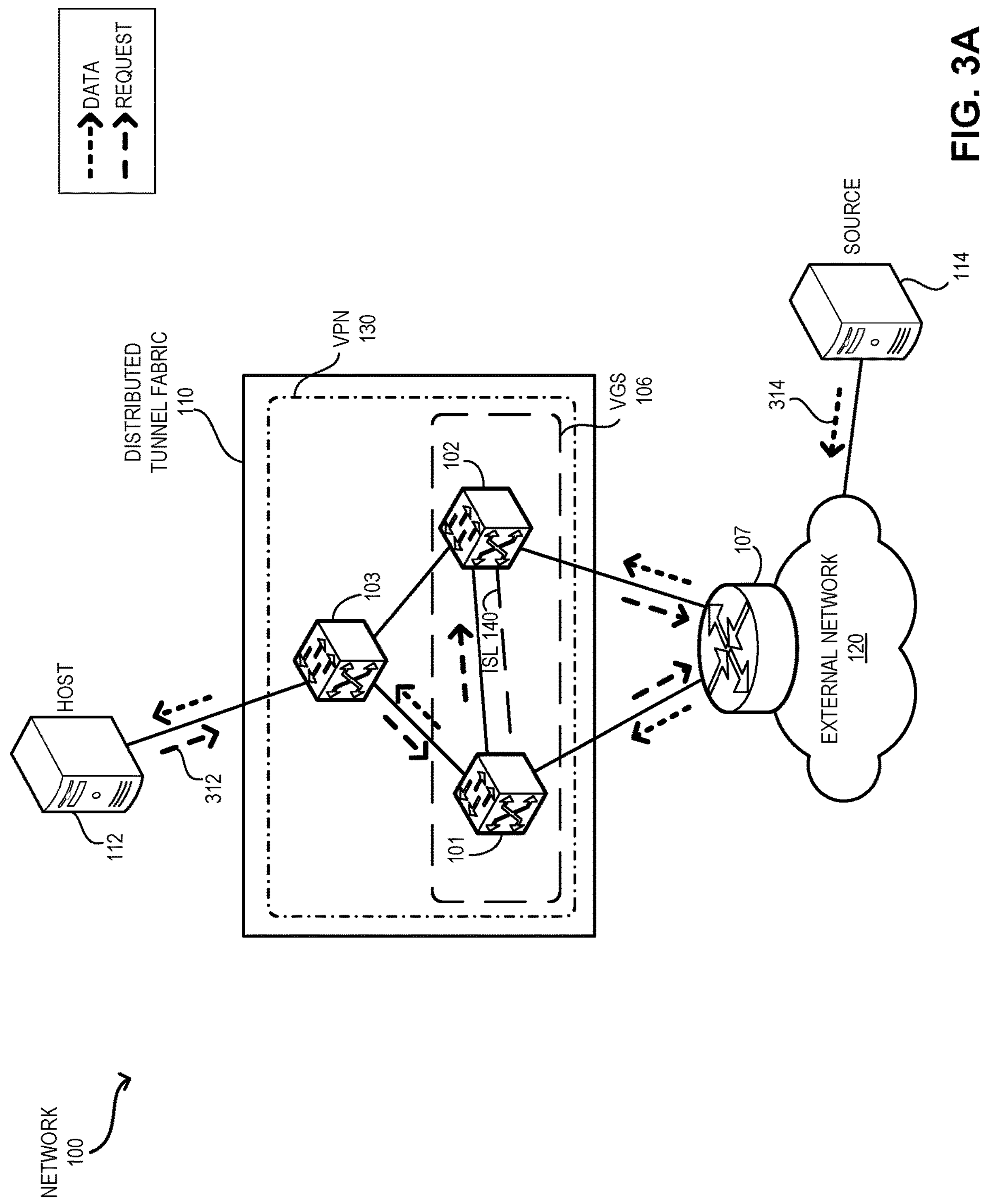
FIG. 3A illustrates exemplary multi-destination packet management for a source coupled to a distributed tunnel fabric via a routed-only port (ROP), in accordance with an aspect of the present application.

FIG. 3A illustrates exemplary multi-destination packet management for a source coupled to a distributed tunnel fabric via an ROP, in accordance with an aspect of the present application. In this example, device 114 can be the source of data for a multicast group. Device 112 can be a requesting host for the multicast group. Device 114 can be coupled to switch 107, which can be coupled to VGS 106 via ROPs. Hence, switch 107 can be coupled to switches 101 and 102 via individual ROPs. To facilitate the efficient distribution of multicast traffic, switches 101 and 102 can synchronize multicast control packets, such as PIM join and hello messages, via ISL 140. This allows switches 101 and 102 to remain in a synchronized state for the multicast group.

During operation, device 112 can send a join request 312 for the multicast group to switch 103. Switch 103 can forward join request 312 to one of switches 101 and 102 based on a tunnel forwarding policy via the corresponding tunnel. Suppose that switch 101 receives join request 312. Switch 101 can then synchronize join request 312 with switch 102 by forwarding join request 312 via ISL 140, which can be a layer-3 connection. Subsequently, switches 101 and 102 can forward join request 212 to switch 107 via corresponding ROPs. Switch 107 can then add both ROPs to its outgoing interface list for the multicast group. Upon receiving a multicast data packet 314 from device 114, switch 107 can forward packet 314 via a respective ROP in the outgoing interface list. As a result, switch 107 can forward packet packer 314 to switches 101 and 102. The primary switch of VGS 106 can then forward packet 314 to switch 103 via a tunnel. If switch 101 is the primary switch, switch 101 can forward packet 314 to switch 103 via the corresponding tunnel. Switch 103 can then forward packet 314 to device 112.

Figure 3B:
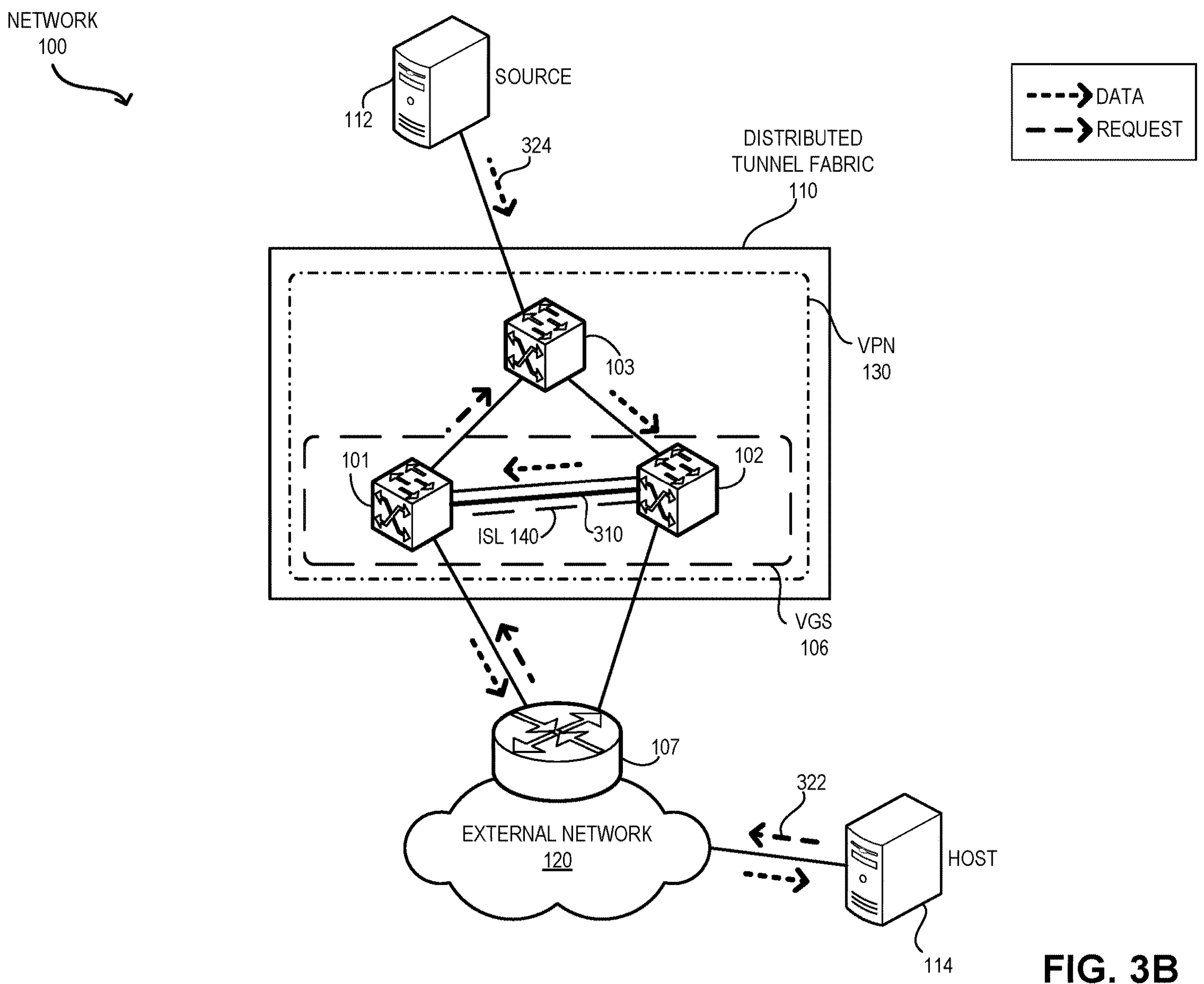
FIG. 3B illustrates exemplary multi-destination packet management with packet sharing for a host coupled to a distributed tunnel fabric via an ROP, in accordance with an aspect of the present application.

FIG. 3B illustrates exemplary multi-destination packet management with packet sharing for a host coupled to a distributed tunnel fabric via an ROP, in accordance with an aspect of the present application. In this example, device 112 can be the source of data for a multicast group. Device 114 can be a requesting host for the multicast group. Device 114 can be coupled to switch 107, which can be coupled to VGS 106 via ROPs. Hence, switch 107 can be coupled to switches 101 and 102 via individual ROPs. Under such a scenario, switches 101 and 102 can synchronize multicast initiation packets, such as PIM hello messages, via ISL 140. However, since switch 107 can forward a join request from device 114 via any of the ROPs, switches 101 and 102 may not synchronize join requests.

During operation, device 114 can send a join request 322 for the multicast group to switch 107. Switch 107 can forward join request 322 to one of switches 101 and 102 based on a routing policy via the ROP. Suppose that switch 101 receives join request 322. Switch 101 can then forward join request 312 to switch 103 via the corresponding tunnel. Switch 103 can then add the corresponding layer-3 TNI, which can identify the tenant associated with device 112, to its outgoing interface list for the multicast group. Furthermore, switches 101 and 102 can create a dedicated sub-interface 310 for the layer-3 TNI and add sub-interface 310 to their respective outgoing interface lists. Upon receiving a multicast data packet 324 from device 112, switch 103 can select one of switches 101 and 102 based on a tunnel forwarding policy.

If switch 103 selects switch 102, switch 103 can forward packet 324 to switch 102 as a unicast packet via the corresponding tunnel. Switch 102 can then synchronize packet 324 with switch 101 by forwarding packet 324 via sub-interface 310. In this way, both switches 101 and 102 would receive packet 324. The primary switch of VGS 106 can then forward packet 324 to switch 107 via the corresponding ROP. If switch 101 is the primary switch, switch 101 can forward packet 324, which has been shared by switch 102, to switch 107 via the corresponding ROP. Switch 103 can then forward packet 324 to device 114.

Figure 3C:
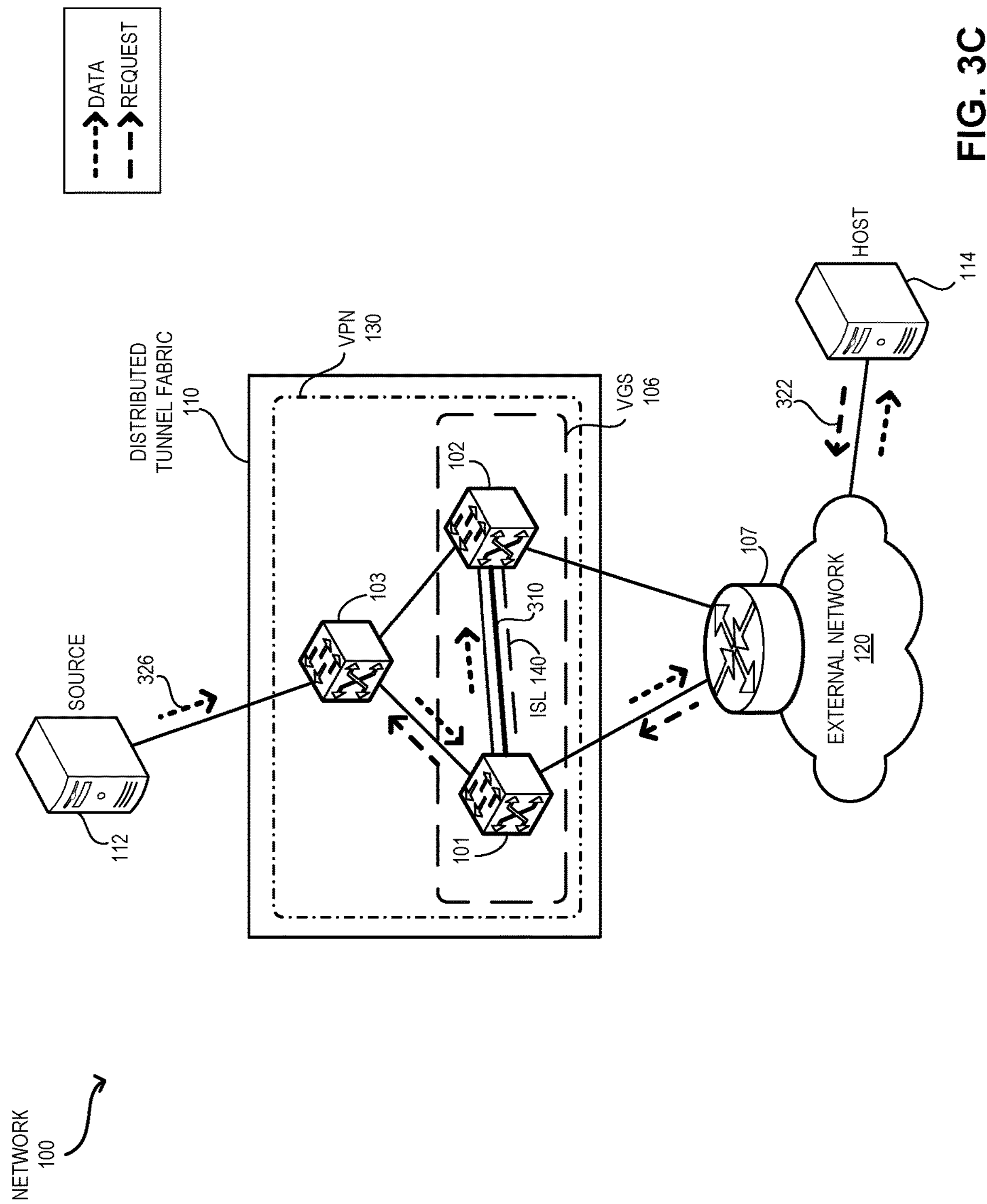
FIG. 3C illustrates exemplary multi-destination packet management without packet sharing for a host coupled to a distributed tunnel fabric via an ROP, in accordance with an aspect of the present application.

However, if the primary switch of VGS 106 receives packet 324, which has received pending join request 322, that primary switch can forward packet 324 without relying on shared data. FIG. 3C illustrates exemplary multi-destination packet management without packet sharing for a host coupled to a distributed tunnel fabric via an ROP, in accordance with an aspect of the present application. Suppose that switch 103 selects switch 101 for forwarding a multicast data packet 326 of the multicast group associated with join request 322. Switch 103 can then forward packet 326 to switch 101 as a unicast packet via the corresponding tunnel. Switch 101 can then synchronize packet 326 with switch 102 by forwarding packet 326 via sub-interface 310. Switch 101 can also forward packet 326 to switch 107 via the corresponding ROP without relying on shared data from switch 102. Switch 103 can then forward packet 326 to device 114. On the other hand, since switch 102 is not the primary switch, switch 102 can refrain from sending packet 326 via the ROP coupling switch 107.

Figure 4A:
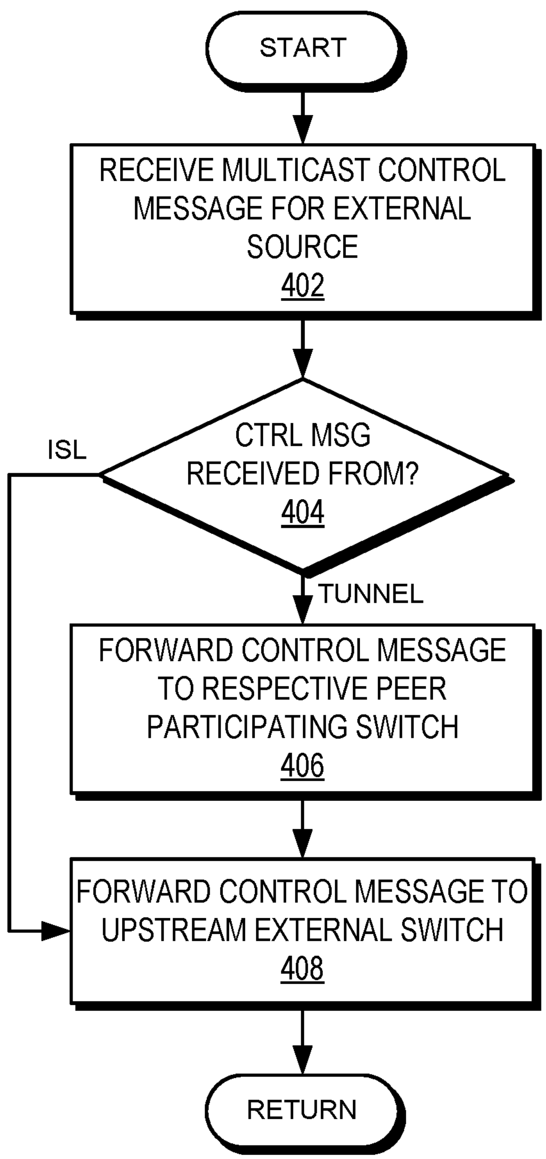
FIG. 4A presents a flowchart illustrating the process of a participating switch of a virtual gateway switch (VGS) forwarding a control message to a source coupled to a distributed tunnel fabric, in accordance with an aspect of the present application.

FIG. 4A presents a flowchart illustrating the process of a participating switch of a VGS forwarding a control message to a source coupled to a distributed tunnel fabric, in accordance with an aspect of the present application. During operation, the switch can receive a multicast control message for an external source (operation 402). The switch can then determine the type of ingress connection from which the control message is received (operation 404). If the control message is received from a tunnel of the fabric, the switch can forward the control message to a respective peer participating switch (operation 406). If the control message is received from an ISL (operation 404) or upon forwarding the control message to a respective peer participating switch (operation 406), the switch can forward the control message to an upstream external switch (operation 408).

Figure 4B:
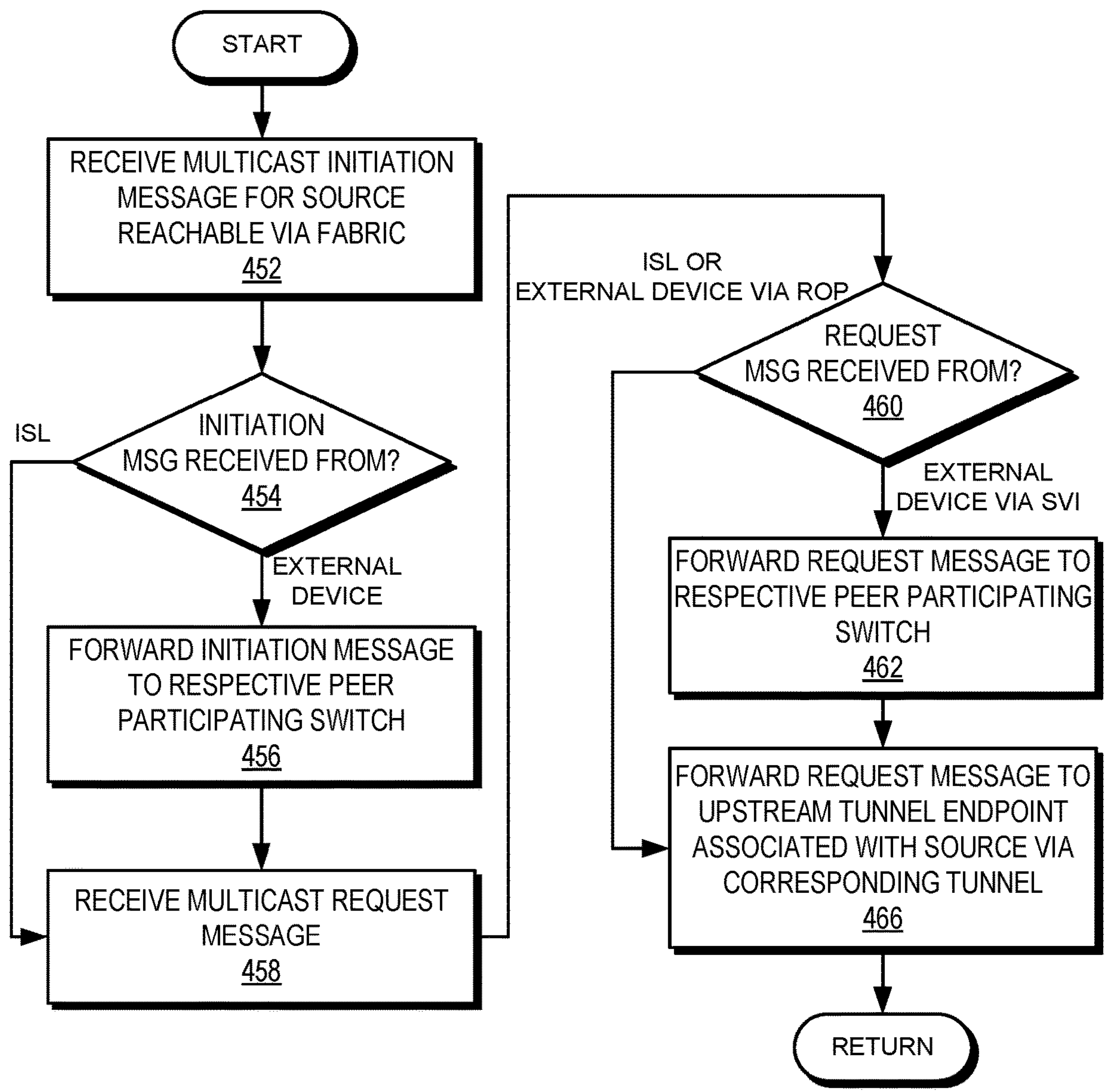
FIG. 4B presents a flowchart illustrating the process of a participating switch of a VGS forwarding a control message from a source coupled to a distributed tunnel fabric, in accordance with an aspect of the present application.

FIG. 4B presents a flowchart illustrating the process of a participating switch of a VGS forwarding a control message from a source coupled to a distributed tunnel fabric, in accordance with an aspect of the present application. During operation, the switch can receive a multicast initiation message, such as a PIM Hello message, for a source reachable via the fabric (operation 452). The switch can then determine the type of ingress connection from which the initiation message is received (operation 454). If the initiation message is received from an external device, the switch can forward the initiation message to a respective peer participating switch (operation 456). If the initiation message is received from an ISL (operation 454) or upon forwarding the initiation message (operation 456), the switch can receive a multicast request message (operation 458).

The switch can then determine the type of ingress connection from which the request message is received (operation 460). If the request message is received from an external device reachable via an SVI, the switch can forward the request message to a respective peer participating switch (operation 462) and an upstream tunnel endpoint associated with the source via a corresponding tunnel (operation 466). On the other hand, if the initiation message is received from an ISL or an external device reachable via an ROP (operation 454), the switch refrains from synchronizing the request message. The switch can then forward the request message to the upstream tunnel endpoint associated with the source via the corresponding tunnel (operation 466).

Figure 5A:
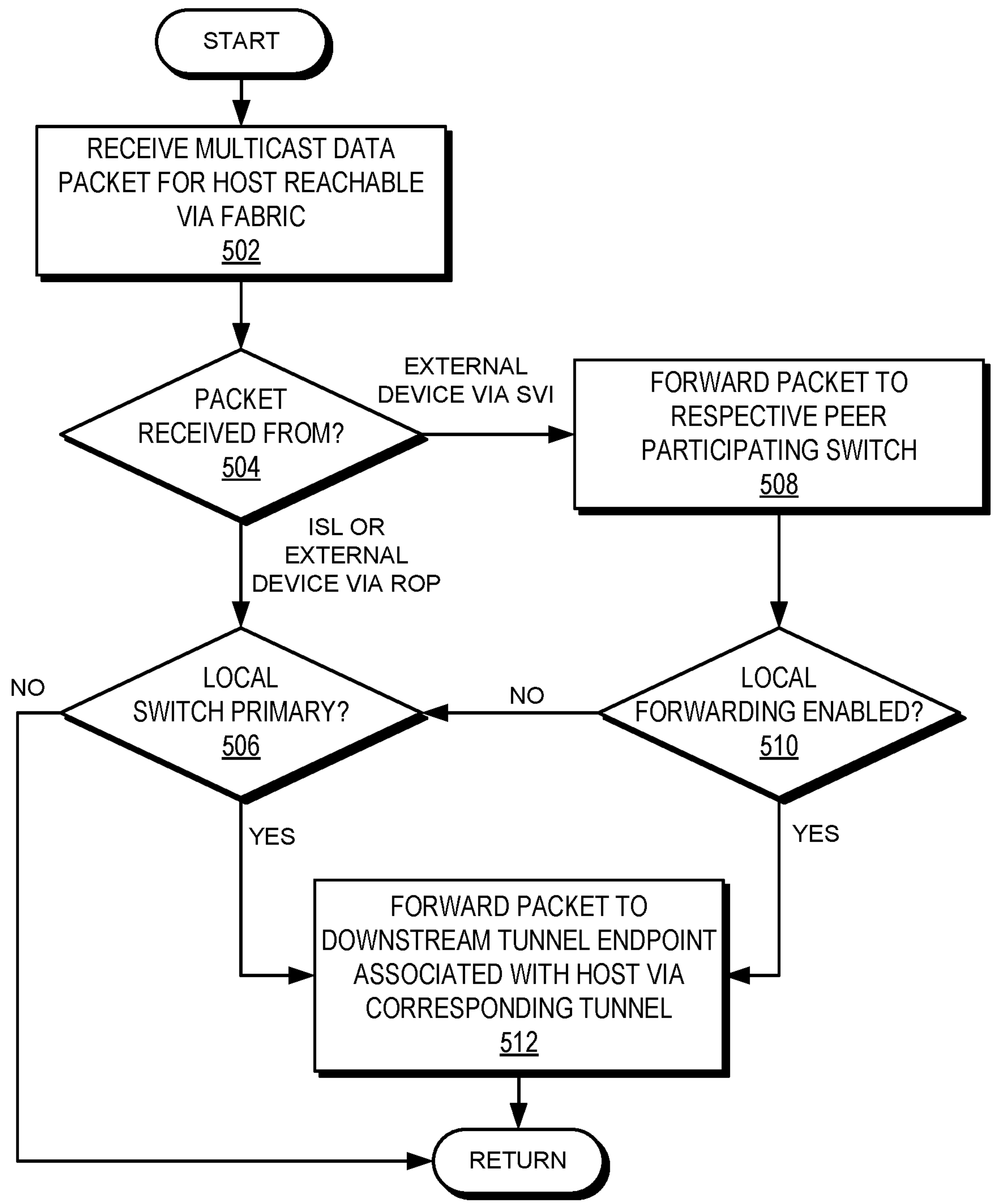
FIG. 5A presents a flowchart illustrating the process of a participating switch of a VGS forwarding a data packet to a source coupled to a distributed tunnel fabric, in accordance with an aspect of the present application.

FIG. 5A presents a flowchart illustrating the process of a participating switch of a VGS forwarding a data packet to a source coupled to a distributed tunnel fabric, in accordance with an aspect of the present application. During operation, the switch can receive a multicast data packet for a host reachable via the fabric (operation 502). The switch can then determine the type of ingress connection from which the data packet is received (operation 504). If the data packet is received from an external device reachable via an SVI, the switch can forward the data packet to a respective peer participating switch (operation 508) and determine whether local forwarding is enabled (operation 510).

If local forwarding is enabled, the switch can forward the data packet to the downstream tunnel endpoint associated with the host via the corresponding tunnel (operation 512).

If local forwarding is not enabled, the switch can determine whether the local switch is the primary switch for the VGS (operation 506). On the other hand, if the data packet is received from an ISL or an external device reachable via an ROP (operation 454), the switch refrains from synchronizing the data packet. The switch can then determine whether the local switch is the primary switch for the VGS (operation 506). If the local switch is the primary switch for the VGS, the switch can forward the data packet to the downstream tunnel endpoint associated with the host via the corresponding tunnel (operation 512).

Figure 5B:
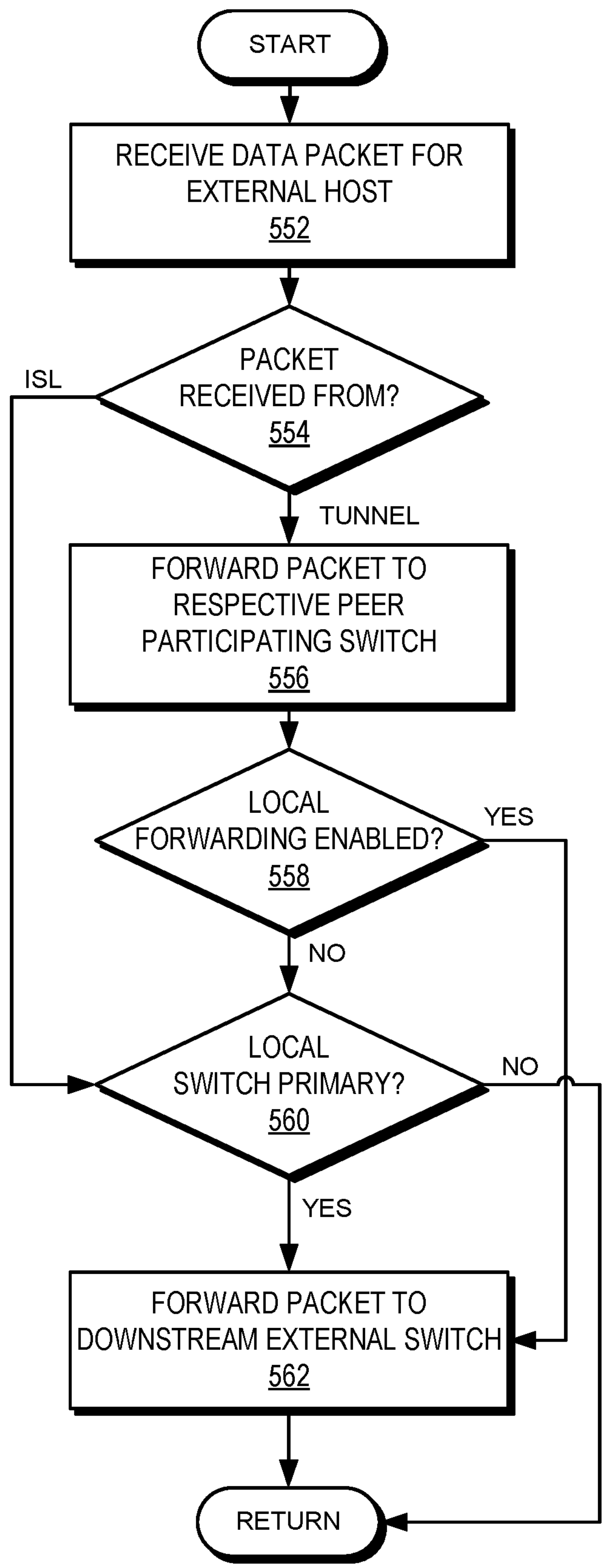
FIG. 5B presents a flowchart illustrating the process of a participating switch of a VGS forwarding a data packet from a source coupled to a distributed tunnel fabric, in accordance with an aspect of the present application.

FIG. 5B presents a flowchart illustrating the process of a participating switch of a VGS forwarding a data packet from a source coupled to a distributed tunnel fabric, in accordance with an aspect of the present application. During operation, the switch can receive a multicast data packet for an external (operation 552). The switch can then determine the type of ingress connection from which the data packet is received (operation 554). If the data packet is received from a tunnel of the fabric, the switch can forward the data packet to a respective peer participating switch (operation 556) and determine whether local forwarding is enabled (operation 558).

If local forwarding is enabled, the switch can forward the data packet to the downstream external switch (operation 562). If local forwarding is not enabled (operation 558) or the data packet is received from an ISL (operation 554), the switch can determine whether the local switch is the primary switch for the VGS (operation 560). If the local switch is the primary switch for the VGS, the switch can forward the data packet to the downstream external switch (operation 562).

Figure 6:
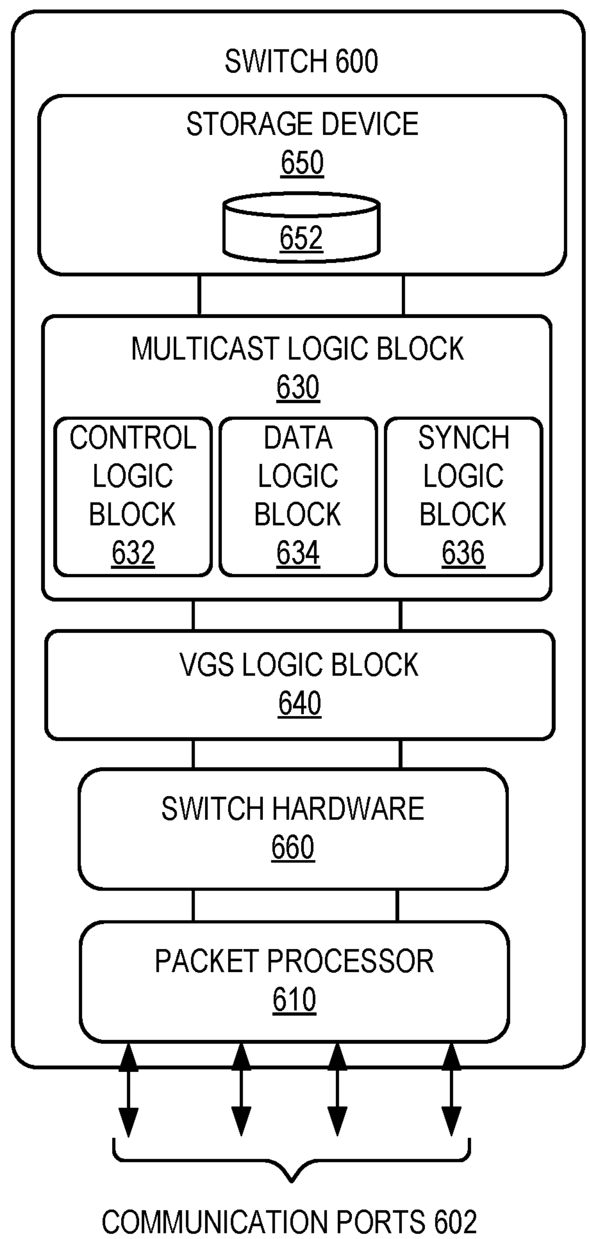
FIG. 6 illustrates an exemplary switch facilitating a virtual gateway supporting efficient multi-destination packet management in a distributed tunnel fabric, in accordance with an aspect of the present application.

FIG. 6 illustrates an exemplary switch supporting the dynamic activation of virtual networks, in accordance with an aspect of the present application. In this example, a switch 600 includes a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 extracts and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more DBMS instances. Database 652 can store information associated with a respective multicast group, tunnel, EVPN, and interface associated with switch 600. Switch 600 can include a VGS logic block 640. VGS logic block 640 can allows switch 600 to operate as a VGS, such as VGS 106, in a tunnel fabric. To do so, VGS logic block 640 may operate in conjunction with another switch.

Switch 600 can include a multicast logic block 630, which can include a control logic block 632, a data logic block 634, and a synchronization logic block 636. Control logic block 632 can determine how to process a multicast control packet at switch 600 while operating as a VGS. Control logic block 632 can determine whether to forward the control packet to another switch based on the ingress connection of the control packet. Data logic block 634 can determine how to process a multicast data packet at switch 600 while operating as the VGS. Data logic block 634 can determine whether to forward the data packet to another switch based on the ingress and egress connections of the data packet. Synchronization logic block 636 can maintain an ISL and/or a dedicated sub-interface with other participating switches of the VGS. Furthermore, synchronization logic block 636 can determine whether to synchronize a control and/or data packet with other participating switches of the VGS.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:

receiving, by a first switch, a join request for a multicast group from a host, wherein the first switch is to operate as part of a virtual switch in conjunction with a second switch, and wherein the virtual switch is to operate as a gateway for an overlay tunnel fabric that includes the first and second switches;

determining, by the first switch, whether to forward the join request to the second switch, which is part of the virtual switch, based on a type of a first ingress connection of the join request;

receiving a data packet for the multicast group at the first switch via a second ingress connection; and determining whether to forward the data packet to the second switch and whether to forward the data packet to an egress connection to the host based on a type of the second ingress connection and a type of the egress connection, wherein a type of a respective connection indicates whether the connection includes an overlay tunnel.

2. The method of claim 1, wherein determining whether to forward the data packet further comprises determining a forwarding role of the first switch for the virtual switch.

3. The method of claim 2, wherein the forwarding role at least indicates that:

the first switch is a primary switch for the virtual switch; or the first switch has received the data packet.

4. The method of claim 1, wherein the type of the first ingress connection corresponds to a tunnel of the fabric;

wherein the method further comprises forwarding the join request to the second switch and a source of the multicast group.

5. The method of claim 1, wherein the type of the first ingress connection corresponds to an inter-switch link coupling the second switch;

wherein the method further comprises forwarding the join request to a source of the multicast group based on the type of the egress connection.

6. The method of claim 1, wherein the type of the egress connection corresponds to a tunnel of the fabric associated with the host;

wherein the method further comprises forwarding the data packet via the tunnel.

7. The method of claim 1, wherein the type of the egress connection corresponds to a logical layer-3 interface coupling an external switch;

wherein the method further comprises forwarding the data packet via the logical layer-3 interface and to the second switch.

8. The method of claim 7, wherein the logical layer-3 interface is deployed over a link aggregation coupling an external switch to the first and second switches; and wherein the forwarding the data packet via the logical layer-3 interface further comprises determining whether the first switch is to forward the data packet for the link aggregation.

9. The method of claim 1, wherein the type of the egress connection corresponds to a routed port coupling an external switch;

wherein the method further comprises:

forwarding the data packet to the external switch via the routed port; and forwarding the data packet to the second switch via a dedicated sub-interface to the second switch.

10. The method of claim 9, further comprising refraining from forwarding the join request to the second switch.

11. A computer system, comprising:

a processor;

a non-transitory computer-readable storage medium storing instructions, which when executed by the processor causes the processor to perform a method, the method comprising:

receiving, by the computer system, a join request for a multicast group from a host, wherein the computer system is to operate as part of a virtual switch in conjunction with a second computer system, and wherein the virtual switch is to operate as a gateway for an overlay tunnel fabric that includes the computer system and the second computer system;

determining, by the computer system, whether to forward the join request to the second computer system, which is part of the virtual switch, based on a type of a first ingress connection of the join request; and receiving a data packet for the multicast group at the first switch via a second ingress connection; and determining whether to forward the data packet to the second computer system and whether to forward the data packet to an egress connection to the host based on a type of the second ingress connection of and a type of the egress connection, wherein a type of a respective connection indicates whether the connection includes an overlay tunnel.

12. The computer system of claim 11, wherein determining whether to forward the data packet further comprises determining a forwarding role of the computer system for the virtual switch.

13. The computer system of claim 12, wherein the forwarding role at least indicates that:

the computer system is a primary switch for the virtual switch; or the computer system has received the data packet.

14. The computer system of claim 11, wherein the type of the first ingress connection corresponds to a tunnel of the fabric;

wherein the method further comprises forwarding the join request to the second computer system and a source of the multicast group.

15. The computer system of claim 11, wherein the type of the first ingress connection corresponds to an inter-switch link coupling the second computer system;

wherein the method further comprises forwarding the join request to a source of the multicast group based on the type of the egress connection.

16. The computer system of claim 11, wherein the type of the egress connection corresponds to a tunnel of the fabric associated with the host;

wherein the method further comprises forwarding the data packet via the tunnel.

17. The computer system of claim 11, wherein the type of the egress connection corresponds to a logical layer-3 interface coupling an external switch;

wherein the method further comprises forwarding the data packet via the logical layer-3 interface and to the second computer system.

18. The computer system of claim 17, wherein the logical layer-3 interface is deployed over a link aggregation coupling an external switch to the computer system and the second computer system; and wherein the forwarding the data packet via the logical layer-3 interface further comprises determining whether the computer system is to forward the data packet for the link aggregation.

19. The computer system of claim 11, wherein the type of the egress connection corresponds to a routed port coupling an external switch;

wherein the method further comprises:

forwarding the data packet to the external switch via the routed port; and forwarding the data packet to the second computer system via a dedicated sub-interface to the second computer system.

20. The computer system of claim 19, wherein the method further comprises refraining from forwarding the join request to the second computer system.

* * * * *